US007042306B2

(12) United States Patent
Roberson et al.

(10) Patent No.: US 7,042,306 B2
(45) **Date of Patent: *May 9, 2006**

(54) THREE DIMENSIONAL MULTIMODE AND OPTICAL COUPLING DEVICES

(75) Inventors: Mark W. Roberson, Cary, NC (US); Philip A. Deane, Durham, NC (US); Charles Kenneth Williams, Raleigh, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/884,963

(22) Filed: Jul. 7, 2004

(65) Prior Publication Data

US 2004/0246065 A1 Dec. 9, 2004

Related U.S. Application Data

(62) Division of application No. 10/334,985, filed on Dec. 31, 2002, now Pat. No. 6,906,598.

(51) Int. Cl.
*H01P 5/00* (2006.01)
*G02B 6/26* (2006.01)

(52) U.S. Cl. .................... 333/24 R; 333/109; 333/116; 385/42

(58) Field of Classification Search .............. 333/24 R, 333/109, 116, 240; 385/15, 41, 42, 131
See application file for complete search history.

(56) References Cited

U.S. PATENT DOCUMENTS

| | | | |
|---|---|---|---|
| 4,689,584 | A | 8/1987 | Sequeira |
| 4,998,665 | A | 3/1991 | Hayashi |
| 5,162,613 | A | 11/1992 | Schoenthaler |
| 5,214,308 | A | 5/1993 | Nishiguchi et al. |
| 5,371,404 | A | 12/1994 | Juskey et al. |
| 5,382,827 | A | 1/1995 | Wang et al. |
| 5,510,758 | A | 4/1996 | Fujita et al. |
| 5,534,465 | A | 7/1996 | Frye et al. |

(Continued)

OTHER PUBLICATIONS

David M. Pozar; *Microwave Engineering*: 1998; pp. 56-73 (Chapter 2, 2,.1, 2.2, 2.3, 2.4); pp. 160-168 (Chapter 3.8, 3.9), pp. 351-368 383-416 (Chapter 7.1, 7.2, 7.3, 7.4, 7.6, 7.7, 7.8, and 7.9), pp. 422-430 (Chapter 8, 8.1); John Whiley & Sons, Inc.; USA.

(Continued)

*Primary Examiner*—Dean Takaoka
(74) *Attorney, Agent, or Firm*—Oblon, Spivak, McClelland, Maier & Neustadt, P.C.

(57) ABSTRACT

Three dimensional electronic and optical coupling devices that are capable of providing high speed coupling over a large frequency range while limiting the amount of space consumption in the communications network. An optical or electrical coupling device comprises a first substrate and a second substrate adjacent to the first substrate having one or more optical waveguides or microstrips formed thereon. The substrates will have disposed thereon conductive microstrips and/or dielectric elements. The one or more optical waveguides or microstrips formed on the first substrate correspond to at least one optical waveguides or microstrips formed on the second substrate so as to facilitate optical coupling between the corresponding waveguides. Precise spacing between the substrates and precise spacing between the optical waveguides or microstrips facilitate the requisite optical/RF coupling.

62 Claims, 4 Drawing Sheets

U.S. PATENT DOCUMENTS

| | | | |
|---|---|---|---|
| 5,576,669 | A | 11/1996 | Ruelke |
| 5,629,566 | A | 5/1997 | Doi et al. |
| 5,675,889 | A | 10/1997 | Acocella et al. |
| 5,700,715 | A | 12/1997 | Pasch |
| 5,744,869 | A | 4/1998 | Root |
| 5,751,060 | A | 5/1998 | Laine et al. |
| 5,773,897 | A | 6/1998 | Wen et al. |
| 5,784,261 | A | 7/1998 | Pedder |
| 5,790,377 | A | 8/1998 | Schreiber et al. |
| 5,804,882 | A | 9/1998 | Tsukagoshi et al. |
| 5,805,422 | A | 9/1998 | Otake et al. |
| 5,834,849 | A | 11/1998 | Lane |
| 5,854,514 | A | 12/1998 | Roldan et al. |
| 5,869,894 | A | 2/1999 | Degani et al. |
| 5,872,393 | A | 2/1999 | Sakai et al. |
| 5,880,017 | A | 3/1999 | Schwiebert et al. |
| 5,889,327 | A | 3/1999 | Washida et al. |
| 5,898,223 | A | 4/1999 | Frye et al. |
| 5,907,187 | A | 5/1999 | Koiwa et al. |
| 5,939,783 | A | 8/1999 | Laine et al. |
| 5,962,925 | A | 10/1999 | Eifuku et al. |
| 6,008,534 | A | 12/1999 | Fulcher |
| 6,016,013 | A | 1/2000 | Baba |
| 6,049,128 | A | 4/2000 | Kitano et al. |
| 6,057,600 | A | 5/2000 | Kitazawa et al. |
| 6,064,114 | A | 5/2000 | Higgins, III |
| 6,081,030 | A | 6/2000 | Jaouen et al. |
| 6,093,969 | A | 7/2000 | Lin |
| 6,100,593 | A | 8/2000 | Yu et al. |
| 6,121,682 | A | 9/2000 | Kim |
| 6,140,144 | A | 10/2000 | Najafi et al. |
| 6,528,732 | B1 | 3/2003 | Okubora et al. |
| 6,611,181 | B1 | 8/2003 | Marketkar et al. |
| 6,724,968 | B1 * | 4/2004 | Lackritz et al. ............. 385/131 |
| 6,785,447 | B1 * | 8/2004 | Yoshimura et al. ........... 385/42 |

OTHER PUBLICATIONS

Bahaa E.A. Saleh, Mavlin Carl Teich; *Fundamentals of Photonics*; 2001; pp. 260-269; John Wiey & Sons, Inc.; USA.

* cited by examiner

THREE DIMENSIONAL MULTIMODE AND OPTICAL COUPLING DEVICES

CROSS REFERENCE TO RELATED APPLICATIONS

This application is a divisional of and claims priority under 35 U.S.C. § 120 to U.S. Ser. No. 10/334,985 filed Dec. 31, 2002, now U.S. Pat. No. 6,906,598.

FIELD OF THE INVENTION

The present invention relates generally to electronic and optical coupling devices and, more particularly, to three-dimensional multimode and optical coupling devices capable of being implemented in high speed switching devices.

BACKGROUND OF THE INVENTION

Microstrip line is one of the most popular types of planar transmission lines, primarily because it can be fabricated by photolithographic processes and is easily integrated with other passive and active microwave devices. Microstrip line is a kind of "high grade" printed circuit construction, consisting of a track of copper or other conductor on an insulating substrate. There is a "backplane" on the other side of the insulating substrate, formed from similar conductor. The track is considered the "hot" conductor and the backplane is considered the "return" conductor. Microstrip is therefore a variant of a two-wire transmission line.

Conventional microstrip couplers are typically formed on the surface of a single semiconductor substrate. As such, the couplers operate in a two-dimensional plane. The maximum usable frequency range for these couplers is a function of the material used to form the microstrips, the length of the microstrips, the width of the microstrips and the spacing between coupling microstrips. With the advent of high-speed networks the need exists to implement coupling devices that have an increased maximum usable frequency range. Typically, space consumption on the substrate is a limiting factor in terms of increasing the maximum usable frequency range of the microstrip couplers. In most instances it is not feasible to increase the width and/or length of the microstrips in order to maximize the usable frequency range. Therefore, a need exists to develop a microstrip coupling mechanism that will realize increased maximum usable frequency range while limiting the amount of area consumed on the substrate.

While microstrips prevail as a mode of microwave signal transmission, waveguides provide for a similar transmission path for optical signals. Advances in optical sciences have recently been widely recognized for their impact in the field of communications. These advances have precipitated innovation towards an all-optical network, which includes; sources, modulators, wavelength division multiplexers, amplifiers and functional optical devices. Such an all-optical network would provide increased bandwidth. However, barriers still exist that prevent the total realization of an all-optical network. One key problem for both telecommunications and data communications in an all-optical environment is in the area of integration, i.e. being able to integrate and connect a myriad of optical devices in a confined space. In this regard, the increasing sophistication of the network leads to greater complexity. More network elements—such as multiplexers, de-multiplexers, lasers, modulators, etc.—need to share the limited space available on a substrate or semiconductor chip. Thus, in order to implement a fully optical network, it becomes increasingly important to integrate multiple optical elements while limiting the consumption of space.

Integrated optics technology is already finding wide applications in telecommunications and computer technology, and one can confidently expect that in the near future concepts like waveguides and optical network will have firmly entered the household usage. The developments of this future technology are still being carried out and improvements in this area include the need to develop integrated components and devices that minimize space consumption on the chip/substrate and accomplish this task in a cost effective manufacturing environment.

SUMMARY OF THE INVENTION

Three dimensional electronic and optical coupling devices are therefore provided that are capable of high speed coupling over a large frequency range while limiting the amount of space consumption in the communications network.

In a first embodiment of the invention an electrical coupling device comprises first and second substrates, a substrate connection means that serves to structurally connect the first substrate to the second substrate and to space the first substrate from the second substrate. Additionally, the device includes first and second electrically conductive microstrips and a first dielectric element disposed upon the first and second substrates such that each substrate carries at least one element selected from the group consisting of the first and second electrically conductive microstrips and the first dielectric element. The first and second electrically conductive microstrips interact to facilitate the transfer of energy between the microstrips and the first dielectric element alters frequency characteristics of the transfer of energy. The substrate connection means may include, a plurality of solder bumps, bonding means or any other suitable means of structurally connecting the substrates. In devices implementing solder bumps, the solder bumps define a predetermined separation distance between the first and second substrates. Precise spacing between the substrates and precise spacing between the optical waveguides facilitate the requisite optical coupling.

In one embodiment of the electrical coupling device the first electrically conductive microstrip is disposed on the first substrate, the first dielectric element is disposed on the first substrate and the second electrically conductive microstrip is disposed on the second substrate. A second dielectric element may be disposed on either substrate to additionally alter the frequency characteristics of the transfer of energy. Additional substrates having additional multistrips or dielectric elements may be stacked above the second substrate to accommodate additional coupling capacity.

The substrate materials may be similar or, as flip-chip processing allows, the substrate materials may be dissimilar. Examples of substrate materials include, but are not limited to, silicon, germanium, indium phosphate, gallium arsenide, alumina, polytetrafluoroethylene (PTFE), lithium niobate and ceramic. In embodiments implementing solder bumps, the solder bumps may provide purely structural support or they may also provide electrical connectivity between the first and second substrates. The microstrips may, by way of example, be formed of gold, copper or any other conductive material. The dielectric elements may be formed of silicon nitride, silicon dioxide, benzocyclobutene (BCB) or any other suitable dielectric material.

In another embodiment of the present invention an electrical coupling device includes a first substrate having a first and second electrically conductive microstrips disposed thereon and a second substrate adjacent to the first substrate having a third and fourth electrically conductive microstrips disposed thereon. A substrate connection means serves to structurally connect the first substrate to the second substrate and to space the first substrate from the second substrate. In operation, the first, second, third and fourth electrically conductive microstrips interact to facilitate the transfer of energy between the microstrips. The substrate connection means may include, a plurality of solder bumps, bonding means or any other suitable means of structurally connecting the substrates. In one embodiment, a direct current path through one of the plurality of solder bumps may connect the first and third electrically conductive microstrips. Alternating current coupling may connect the second and fourth electrically conductive microstrips.

In another embodiment of the invention an optical coupling device comprises a first substrate having one or more optical waveguides formed thereon and a second substrate adjacent to the first substrate having one or more optical waveguides formed thereon. Typically, the first and second substrates will implement flip-chip inverted substrate design. The couplers will also include a substrate connection means, such as solder bumps, bonding means or the like, that serves to structurally connect the first substrate to the second substrate and to space the first substrate from the second substrate. The one or more optical waveguides formed on the first substrate correspond to at least one optical waveguide formed on the second substrate so as to facilitate optical coupling between the corresponding waveguides. In applications implementing solder bumps, the bumps define a predetermined separation distance between the first and second substrates. Precise spacing between the substrates and precise spacing between the optical waveguides facilitate the requisite optical coupling.

The substrate materials may be similar or, as flip-chip processing allows, the substrate materials may be dissimilar. Examples of substrate materials include, but are not limited to, silicon, germanium, indium phosphate, gallium arsenide, alumina, polytetrafluoroethylene (PTFE), lithium niobate and ceramic. The solder bumps may provide purely structural support or they may also provide electrical connectivity between the first and second substrates. The waveguides may, by way of example, be formed of silicon nitride, silicon dioxide or any other suitable dielectric material.

In one embodiment of the optical coupling device the waveguides are disposed in a corresponding Mach-Zehnder interferometer formation on the first and second substrates so as to provide for an optical switching device. Additional substrates having addition optical waveguide components may be stacked above the second substrate to create multiple layers of optical coupling devices.

The substrate materials may be similar or, as flip-chip processing allows, the substrate materials may be dissimilar. Examples of substrate materials include, but are not limited to barium titanate, silicon, gallium arsenide or the like.

Therefore, the present invention provides for three-dimensional electronic and optical coupling devices that are capable of high speed coupling over a large frequency range while limiting the amount of space consumption in the communications network.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
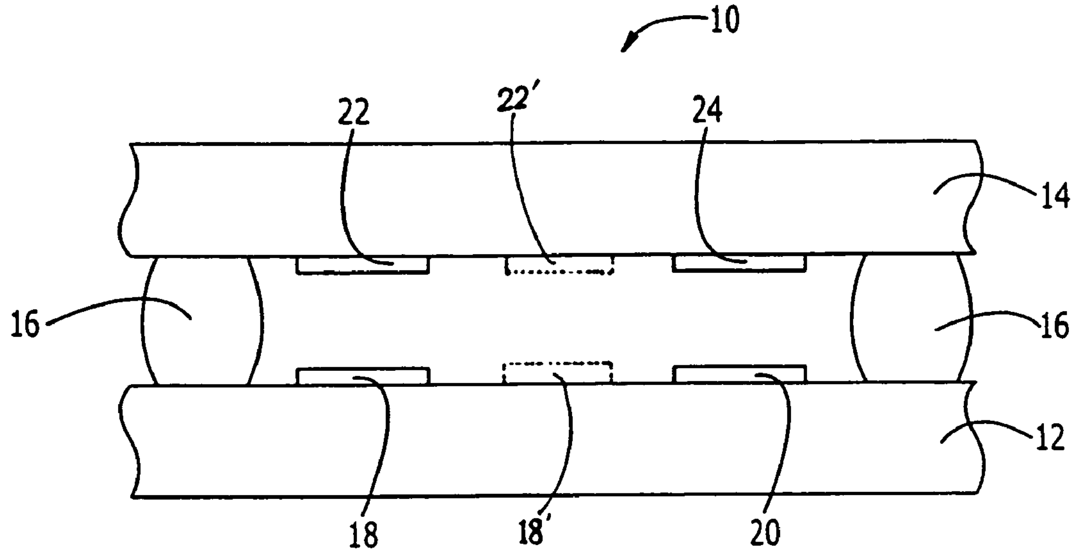
FIG. 1 is a cross-sectional view of a three-dimensional multimode coupling device incorporating solder bumps to precisely vertically separate microstrips and dielectric elements, in accordance with one embodiment of the present invention.
Figure 2:
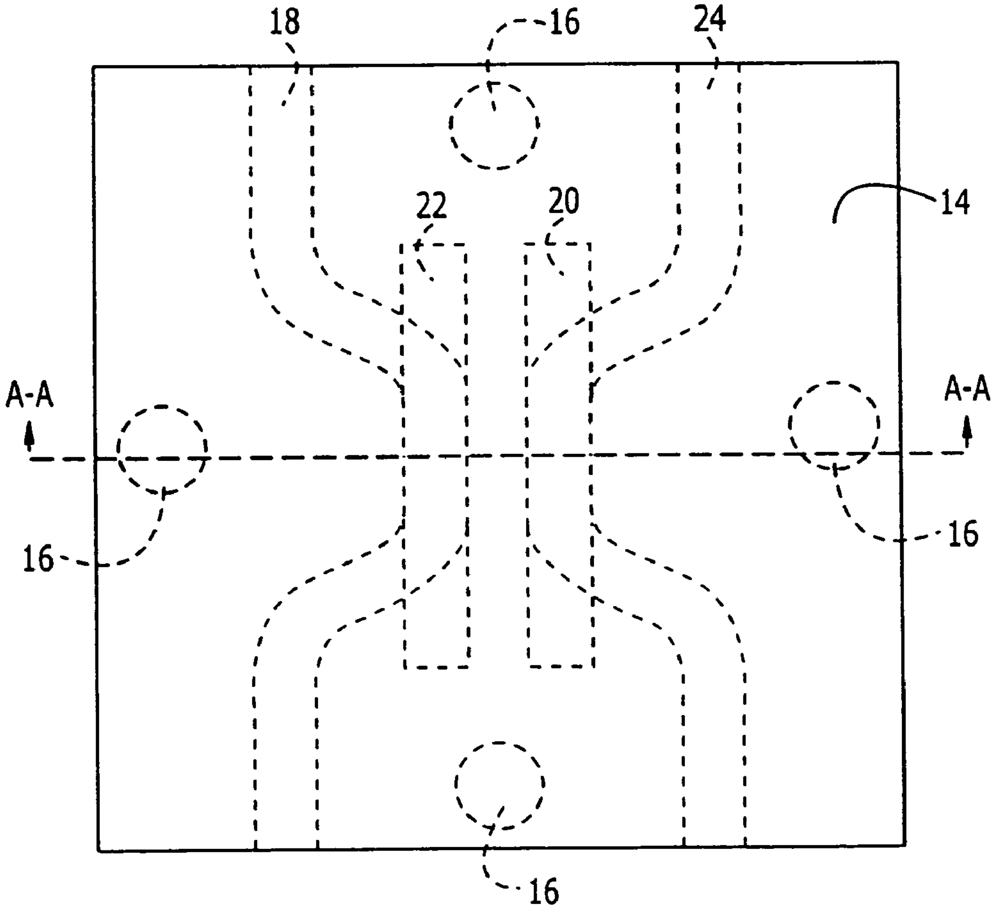
FIG. 2 is a top plan view of the three-dimensional multimode coupling device having precisely space microstrips and dielectric elements, in accordance with one embodiment of the present invention.]

Referring to FIGS. 1 and 2 shown are cross-sectional and plan view schematics of a 3-dimensional multimode coupling device 10, in accordance with an embodiment of the present invention. The coupling device shown in FIGS. 1 and 2 and described in more detail below may serve as an electrically modifiable coupler for use in a high speed circuit network, such as a network operating at about 0.10 giga hertz (GHz) to greater than 50 GHz in order to support an OC-768 rate of 40 gigabits per second (Gbps) on a fiber optic carrier. OC-768 is a current synchronous optical network (SONET) standard rate for data transmission on optical fiber.

The coupling device 10 comprises first substrate 12 and second substrate 14. The first and second substrates are structurally connected by a plurality of solder bumps 16. Typically, flip-chip inverted substrate (FCIS) processing that implements solder bumping methodology will be used to attach precisely the second substrate. FCIS processing allows for unconventional element interactions and an attachment infrastructure (i.e., solder bumps) that provides for active circuitry to be included on the substrates. As opposed to conventional semiconductor structures that are built layer upon layer on a single substrate, FCIS process provides for dissimilar substrates to be functionally joined and provides for the formation of unique elements and/or devices on the paired substrates.

Solder bump technology, which is well known by those of ordinary skill in the art, provides a means to precisely space apart the first and second substrates. Solder bumping is especially advantageous because it provides the capability to precisely align in the x, y and z directions within about 1.0 micrometers (μm). In some applications, in which a coarser alignment tolerance is acceptable, other methods of attaching the first 12 and second substrate 14, such as adhesive bonding, wafer bonding or the like, are possible.

Disposed on the substrates are a plurality of conductive microstrips and/or dielectric elements 18, 20, 22 and 24. In the embodiment shown in FIGS. 1 and 2, a first conductive microstrip 18 and a first dielectric element 20 are disposed on the first substrate and a second conductive microstrip 22 and a second dielectric element 24 are disposed on the second substrate. It should be noted that the arrangement and quantity of conductive microstrips and/or dielectric elements is shown in FIGS. 1 and 2 by way of example only. It also is possible to dispose two or more microstrips 18, 18', 22, 22' in combination with one or more dielectric elements 20, 24 on the first and second substrates in alternate configurations so as to facilitate the require coupling action (i.e. transfer of energy) between the microstrips.

The first and second substrates 12 and 14 may comprise similar or different materials. Typical substrate materials include silicon (Si), germanium (Ge), indium phosphate (InP), gallium arsenide (GaAs), alumina ($Al_2O_3$), magnesium oxide (MgO) lithium niobate ($LiNbO_3$) or a suitable ceramic material. Additionally, semiconductors referred to in the art as flip-chip substrates may comprise the first and/or second substrates. The first and second substrates are typically about 300 to about 500 micrometers in thickness, although for thinned wafers used in wafer bonding the substrates may be about 100 micrometers in thickness and may even be as thin as about 1 micrometer for certain RF dielectric substrate applications.

The solder bumps 16 may be designed to have substantially equal height so that the first and second substrates and corresponding microstrips and/or dielectric elements are positioned in a generally parallel relationship. In these embodiments the height of the solder bumps may range from about 50 micrometers to about 500 micrometers, typically about 100 micrometers to about 200 micrometers. Alternatively, the solder bumps may be designed to have substantially unequal height so that the first and second substrates and corresponding microstrips and/or dielectric elements are positioned in a graded relationship. The solder bumps may be substantially structural in nature or they may additionally provide for electrical connectivity between the first and second substrates. The solder-bumps are typically formed of tin-lead of either high lead composition (95 Pb, 5 Sn) or eutectic lead-tin compositions, although other solder materials may be used, including solder materials that do not include lead.

The conductive microstrips 18 and 22 may comprise gold, copper or any other suitable conductive material. The dielectric elements 20 and 24 may comprise silicon nitride ($Si_3N_4$), silicon dioxide ($SiO_2$), alumina ($Al_2O_3$), ceramic, polytetrafluoroethylene (PTFE) or any other suitable dielectric material (i.e., materials that do not provide conductivity at DC frequencies). The conductive microstrips and dielectric elements are typically formed by conventional photolithographic processing, whereby a layer of photoresist is disposed on the substrate, a pattern is subsequently formed in the photoresist and portions of the photoresist are removed to define the areas in which the microstrips will be formed. The conductive microstrips and dielectric elements will have thickness ranging from about 0.1 micrometers to about 25 micrometers, typically about 1 micrometer to about 10 micrometers. In the cross-sectional plane shown in FIG. 1 the conductive microstrips and the dielectric elements disposed on the first substrate 12 are generally aligned with a corresponding dielectric element and conductive microstrip disposed on the second substrate, however, as FIG. 2 indicates other cross-sectional planes would depict non-alignment of the microstrips and dielectric elements or a skewed relationship between the microstrips and the dielectric elements.

The dielectric elements serve to alter the electrical fields that exist in the coupling device. By alternating the electrical fields the frequency characteristics (i.e., speed of propagation, the strength of the field, etc.) of the transfer of energy between the microstrips is altered. The precise control of the spacing between microstrips and dielectric elements, as well as, the width of the microstrips and dielectric elements provide control over the altering of the electric fields. The width and spacing of the microstrips and the dielectric elements will, typically, range from about 10 micrometers to about 10 centimeters. In one embodiment in which the first and second substrates have a thickness of about 500 micrometers the microstrips and dielectric elements will have a width ranging from about 300 micrometers to about 700 micrometers and spacing between the microstrips and the dielectric elements of about 300 micrometers to about 5000 micrometers.

FIG. 2 illustrates, by way of example, the lengthwise configuration of the microstrips 18 and 24 and the dielectric elements 20 and 22, in accordance with an embodiment of the present invention. The microstrips are formed in configuration so as to provide for a RF (radio frequency) coupler with dielectric elements disposed adjacent to the microstrips to facilitate the altering of the transfer of energy in the coupler.

Figure 3:
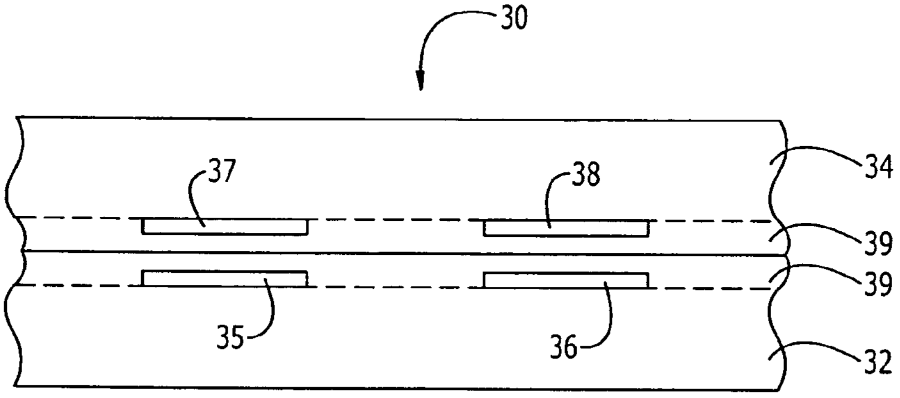
FIG. 3 is a cross-sectional view of a three-dimensional multimode coupling device incorporating a bonding means to precisely vertically separate microstrips and dielectric elements, in accordance with one embodiment of the present invention.

FIG. 3 illustrates a cross-sectional depiction of a three-dimensional multimode coupling device 30, in accordance with an alternate embodiment of the present invention. First and second substrates 32 and 34 are connected by conventional wafer bonding processes, such as anodic wafer bonding or the like. In this embodiment the microstrips and/or dielectric elements 35, 36, 37 and 38 are buried in the substrate construct. In the embodiment shown in FIG. 3, a first conductive microstrip 35 and a first dielectric element 36 are disposed in the first substrate construct and a second conductive microstrip 37 and a second dielectric element 38 are disposed on the second substrate. It should be noted that the arrangement and quantity of conductive microstrips and/or dielectric elements is shown in FIG. 3 is by way of example only. It also possible to dispose two or more microstrips in combination with one or more dielectric elements in the first and second substrates in alternate configurations so as to facilitate the required coupling action (i.e. transfer of energy) between the microstrips.

A dielectric layer 39 is formed over the microstrips to provide necessary isolation. The dielectric layer may be formed by epitaxial growth processing or other known dielectric build-up techniques may be used. The predetermined thickness of the dielectric layer(s) will dictate the separation distance between the first substrate 32 and the second substrate 34 and the vertical separation between the corresponding microstrips and dielectric elements formed thereon. It is also possible to arrange the coupling device such that one substrate has buried microstrips and/or dielectric elements while the opposing substrate has microstrips and/or dielectric elements disposed on the surface of the substrate (similar to FIG. 1).

Figure 4:
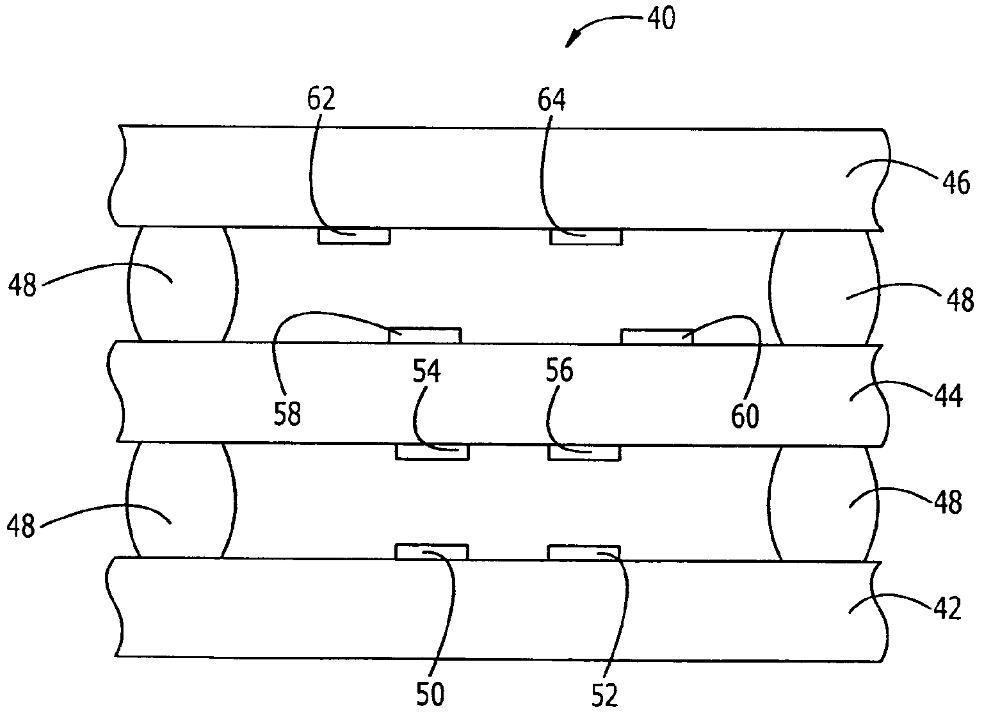
FIG. 4 is cross-sectional view of a three-dimensional multimode coupling device incorporating more than two substrates, in accordance with another embodiment of the present invention.

In accordance with an alternate embodiment of the present invention, a high-speed circuit network may incorporate more than two substrates with additional substrates being stacked one upon another. The substrates may be connected and precisely spaced using solder bumps or stacked wafers such as used in three-dimensional interconnections may be implemented. FIG. 4 illustrates a stacked embodiment of a multimode coupling device, in accordance with an embodiment of the present invention. The coupling device 40 comprises first substrate 42, second substrate 44 and third substrate 46. The first and second substrates are structurally connected by a plurality of solder bumps 48. Solder bump technology, which is well known by those of ordinary skill in the art, provides the means to precisely space apart the first and second substrates. Disposed on the substrates are a plurality of conductive microstrips and/or dielectric elements 50, 52, 54, 56, 58, 60, 62 and 64. In the embodiment shown in FIGS. 1 and 2, a first conductive microstrip 50 and a first dielectric element 52 are disposed on the first substrate, a second and third conductive microstrip 54 and 60 and a second and third dielectric element 56 and 58 are disposed on the second substrate and a fourth conductive microstrip 62 and fourth dielectric element 64 are disposed on the third substrate. It should be noted that the arrangement and quantity of conductive microstrips and/or dielectric elements is shown in FIG. 3 by way of example only.

In an alternate embodiment of the invention, a method for affecting the transfer of electrical energy in a three-dimensional multimode coupler device is defined. As an initial step to the method, a three-dimensional multi-mode coupler device is provided. The device will comprise two or more substrates that are connected so as to be vertically arranged. The two or more substrates will have disposed thereon two or more microstrips, each pair forming a coupler and one or more dielectric elements. The method ensues by applying to one or more of the couplers, one or more microwave fields, which in turn, alters the electrical fields emanating from the one or more couplers. By altering the electrical fields and by predetermining the proper geometric arrangement of the microstrips and dielectric element(s), the frequency characteristics of the transfer of energy between two-dimensional coupler can be altered.

Figure 5:
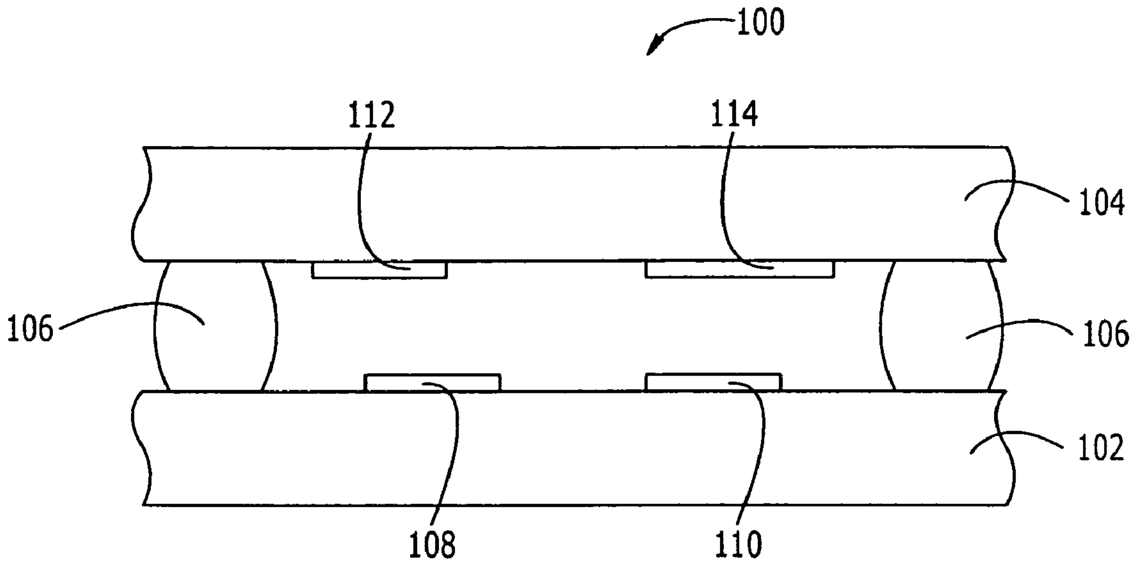
FIG. 5 is a cross-sectional view of a three-dimensional optical coupling device having precisely spaced waveguides, in accordance with an embodiment of the present invention.
Figure 6A:
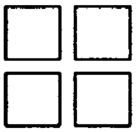
FIGS. 6(*a*)–6(*d*) are cross-sectional representation of waveguides in a three-dimensional coupling device depicting means for coupling the optical signal, in accordance with an embodiment of the present invention.
Figure 6B:
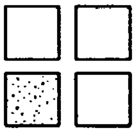
Figure 6C:
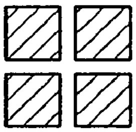
Figure 6D:
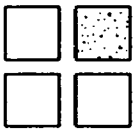

FIG. 5 is a cross-sectional illustration of a 3-dimensional optical coupling device 100, in accordance with an embodiment of the present invention. The optical coupling device 100 comprises first substrate 102 and second substrate 104. The first and second substrates are structurally connected by a plurality of solder bumps 106. Solder bump technology, which is well known by those of ordinary skill in the art, provides the means to precisely space apart the first and second substrates. Alternatively, the first and second substrates may be structurally connected by a wafer bonding process, such as anodic bonding or the like.

Disposed on the substrates are a plurality of dielectric elements 108, 110 112 and 114 that serve as optical waveguides. The three dimensional, n x m matrix of waveguides may be implemented as power splitters, couplers or the like. For example, the 3-dimensional optical coupling device may be implemented in a distributed power coupler, such as a Lange coupler, which typically is embodied in 2-dimensional couplers connected via wire bond jumpers.

In a conventional waveguide coupling structure, two waveguides are fabricated in a single plane orientation in close proximity to one another in order to mutually couple light. The 3-dimensional optocoupler of the present invention enables concurrent coupling in the horizontal plane and the vertical plane. For horizontal and vertical coupling to occur, the waveguides have to be brought in close proximity to one another in both the x and y plane directions.

The first and second substrates 102 and 104 may comprise similar or different materials. Typical substrate materials include silicon (Si), germanium (Ge), indium phosphate (InP), gallium arsenide (GaAs), alumina ($Al_2O_3$), magnesium oxide (MgO) lithium niobate ($LiNbO_3$) or a suitable ceramic material. Additionally, semiconductors referred to in the art as flip-chip substrates may comprise the first and/or second substrates. The first and second substrates are typically about 300 to about 500 micrometers in thickness.

The solder bumps 106 may be designed to have substantially equal height so that the first and second substrates and corresponding optical waveguide elements are positioned in a generally parallel relationship. In these embodiments the height of the solder bumps may range from about 50 micrometers to about 500 micrometers, typically about 100 micrometers to about 200 micrometers. Alternatively, the solder bumps may be designed to have substantially unequal height so that the first and second substrates and corresponding optical waveguide elements are positioned in a sloped relationship.

The dielectric elements 108, 110, 112 and 114 may comprise silicon nitride ($Si_3N_4$), silicon dioxide ($SiO_2$), alumina ($Al_2O_3$), ceramic, polytetrafluoroethylene (PTFE) or any other suitable dielectric material. The conductive optical waveguide elements will have thickness ranging from about 0.1 micrometers to about 25 micrometers, typically about 1 micrometer to about 10 micrometers.

The precise control of the spacing between, as well as, the width of the optical waveguide elements provide control over the altering of the electric fields. The width and spacing of the optical waveguide elements will, typically, range from about 10 micrometers to about 10 centimeters. In one embodiment in which the first and second substrates have a thickness of about 500 micrometers the optical waveguide elements will have a width ranging from about 300 micrometers to about 700 micrometers and spacing between the optical waveguides of about 300 micrometers to about 5000 micrometers.

FIGS. 6(*a*)–6(*d*) are cross-sectional views of a three-dimensional otptocoupler 2×2 matrix. FIG. 6(*a*) illustrates the cross-section when light is not impinged into the optical coupling device. When light (i.e., the optical signal) is launched into the input of the lower left waveguide the resulting output of this device may appear as shown in FIGS. 6(*b*)–6(*d*) with the grey level proportional to the percentage of light in the respective waveguide, i.e., darker means increased percentage of light. The light may remain solely in the waveguide in which the light was launched (FIG. 6(*b*)), the light may be equally divided between all four ports (FIG. 6(*c*)) or the light can be totally coupled into the upper right corner waveguide (FIG. 6(*d*)). It is also possible to provide for partial coupling (i.e., less than 100% coupling) into other combinations of the four ports. The coupling that occurs in the 3-dimensional optocoupler system is determined by the wavelength sensitivity of the waveguides. For example, if two distinct wavelengths enter the lower left corner waveguide/port, coupling may result in one wavelength emerging from the same lower left corner waveguide while the other wavelength may emerge from the upper right corner waveguide.

Three dimensional waveguide couplers may be incorporated into active optical components, such as an optical switch, in accordance with an embodiment of the present invention. The optical switch will incorporate optical waveguides that have photo-conductive or photo-refractive material comprising the coupling region. The material will characteristically be optically transparent. In application, when a second optical signal of different wavelength is input into the coupling device the coupling, or boundary, conditions that define the coupling (i.e., the refractive index and other similar optical parameters) will, typically, be altered such that light will not couple to the neighboring waveguides.

Figure 7:
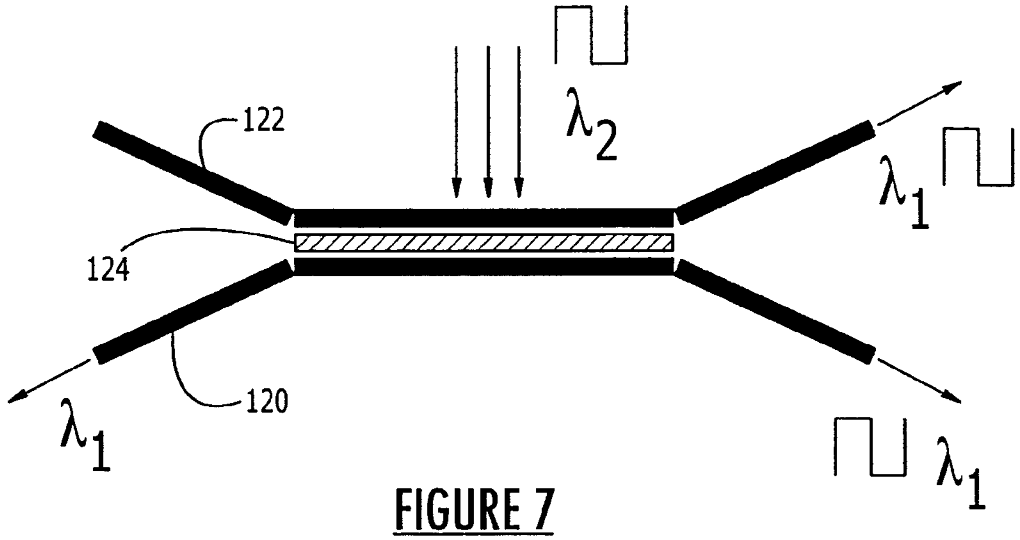
FIG. 7 is a top plan view of an optical coupling device having two optical signals of different wavelength impinge upon the coupling region, in accordance with an embodiment of the present invention.

FIG. 7 illustrates a schematic drawing of the switching action exhibited in a 3-dimensional optical switch, in accordance with an embodiment of the present invention. Wavelength $\lambda_1$ is coupled from waveguide 120 into waveguide 122. After a second light of $\lambda_2$ impinges upon the coupling region 124 the coupling will no longer occur. Therefore, the second light controls the guided wave and switching this light automatically switches the guided beam. Although this switching action is illustrated in a two-dimensional perspective it will prevail in a three dimensional perspective. In the three dimensional structures it is feasible to fabricate numerous switches with the switch light being directed to the coupling region via a delivery waveguide. This provides the impetus for optical logic, whereby, it is possible to switch between two states, for example 0 and 1.

In accordance with yet another embodiment of the invention, three dimensional waveguide structures can be implemented in a dynamic optical router in which wavelength can be used to select a particular route through a three-dimensional cross-connect switch. This transponder function, being able to dynamically switch from one wavelength to another, can be realized by implementing wavelength agile tunable lasers in conjunction with the three-dimensional waveguide structures. The versatility that such a dynamic optical router offers will enable many different service protocols (IP, ATM, etc.) to coexist in complex Wide Area Networks (WANs).

In an alternate method of the invention, a method for affecting the transfer of an optical signal in a three-dimensional multimode optical coupler device is defined. As an initial step to the method, a three-dimensional multi-mode optical coupler device is provided. The device will comprise two or more substrates that are connected so as to be vertically arranged. The two or more substrates will have disposed thereon two or more dielectric waveguides (i.e., at least one dielectric waveguide per substrate) forming three-dimensional optical couplers. The method ensues by applying, to one or more optical couplers, one or more optical signals. By predetermining the geometric three-dimensional structure of the optical couplers, the optical coupling in the one or more optical couplers is altered to change the wavelength characteristics of the transfer of optical power between the two or more waveguides that form the optical coupler.

Figure 8:
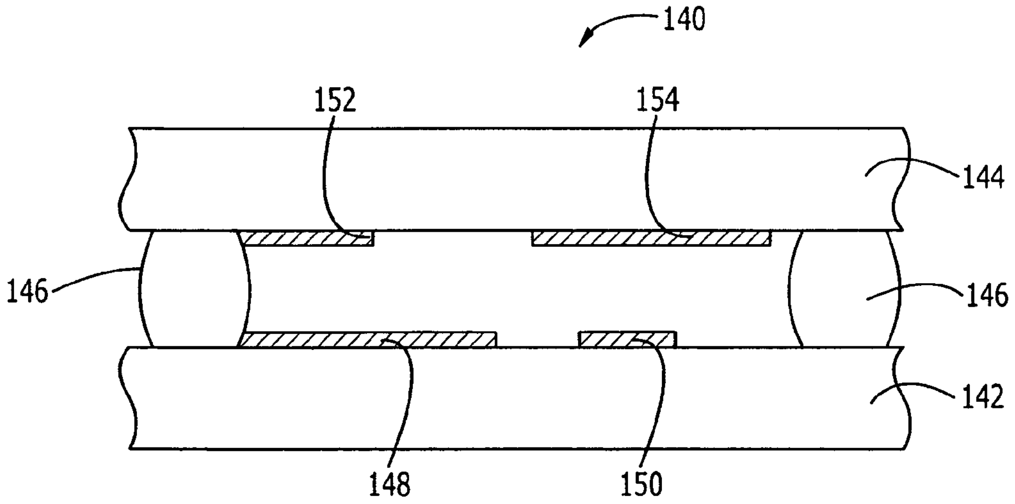
FIG. 8 is a cross-sectional view of a RF (radio frequency) circuit device having precisely spaced microstrips, in accordance with an embodiment of the present invention.

In accordance with another embodiment of the present invention, FIG. 8 depicts a cross-sectional schematic of a 3-dimensional RF circuit device 140. The RF circuit device disclosed herein provides for tighter coupling (i.e., lower power consumption), user configurable modal impedances (i.e., larger operational frequency ranges) and reduced size (an effect of an increase in dielectric constant). The RF circuit device shown in FIG. 8 and described in more detail below may be implemented in electrically modifiable couplers, filters, patch antennas, dielectric resonators or the like. The RF circuit device may form a discrete element or it may be integrated as a module on the substrate.

The RF circuit device 140 comprises first substrate 142 and second substrate 144. The first and second substrates are structurally connected by a plurality of solder bumps 146. As previously described in alternate embodiments, typically, flip-chip inverted substrate (FCIS) processing that implements solder bumping methodology will be used to attach precisely the second substrate to the first substrate. The use of solder bumps and FCIS processing allow the first and second substrates to be precisely spaced apart by a predetermined distance based on the requisite application. Alternatively, the substrates may be structurally connected by a bonding process, such as anodic bonding or the like.

Disposed on the substrates are a plurality of conductive microstrips 148, 150, 152 and 154. In the embodiment shown in FIG. 8 first and second conductive microstrips 148, 150 are disposed on the first substrate and third and fourth conductive microstrips 152, 154 are disposed on the second substrate. It should be noted that the arrangement and quantity of conductive microstrips shown in FIG. 8 is by way of example only. At a minimum conductive microstrips are disposed on at least one surface of either the first or second substrate.

The first and second substrates 148 and 150 may comprise similar or different materials. In one embodiment of the invention, the substrates will comprise low-loss dielectric materials, such as silicon (Si), germanium (Ge), indium phosphate (InP), gallium arsenide (GaAs), alumina ($Al_2O_3$), magnesium oxide (MgO), lithium niobate ($LiNbO_3$) or a suitable ceramic material. The first and second substrates are typically about 300 to about 500 micrometers in thickness.

As described in previous embodiments, the solder bumps 146 may be designed to have substantially equal height so that the first and second substrates and corresponding microstrips are positioned in a generally parallel relationship. In these embodiments the height of the solder bumps may range from about 5 micrometers to about 500 micrometers, typically about 100 micrometers to about 200 micrometers. Alternatively, the solder bumps may be designed to have substantially unequal height so that the first and second substrates and corresponding microstrips are positioned in a sloped relationship.

The solder bumps may be substantially structural in nature or they may additionally provide for electrical connectivity between the first and second substrates. In the embodiment shown in FIG. 8, electrical connection between microstrips 148 and 152 is provided by a DC (direct current) path through one or more solder bumps. Electrical connection between microstrips 150 and 154 is limited to AC (alternating current) coupling between the two microstrips.

The conductive microstrips 148, 150, 152, 154, 156 may comprise gold, copper or any other suitable conductive material. The conductive microstrips will, typically, have thickness ranging from about 0.1 micrometers to about 25 micrometers, typically about 1 micrometer to about 10 micrometers.

By way of example, a 6 dB three-dimensional coupler may be formed according to the following material and dimensional characteristics. The two adjacent substrates may be formed of alumina having a thickness of about 625 micrometers and a dielectric constant of about 10.0. The substrates will generally have a constant separation distance of about 100 micrometers. Ground planes, typically formed of gold or another conductive material, will be formed on the non-adjacent sides of the substrates and will have a typical thickness of about 10 micrometers. Two microstrips are formed on one of the adjoining substrates. The two microstrips will have a width of about 232 micrometers and a separation distance of about 43 micrometers. A dielectric element will be formed on the on the surface of the second substrate that is adjacent to the surface of the first substrate on which the microstrips were formed. The dielectric element will have a width of about 1000 micrometers, to allow for an impedance of about 50 ohms. When the dielectric element is horizontally offset from the two microstrips, the coupling between the microstrips is lessened. For example, when the center point of the dielectric element is offset by distance of 2.75 micrometers, the microstrip coupling, related to the voltage squared of the characteristic modes, is less than about 0.03 percent. Conversely, when the dielectric element is centered over the separation midpoint of the two microstrips, two of the three characteristic propagating modes have the power evenly distributed between all three elements.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An RF electrical coupling device, comprising:

first and second substrates;

a substrate connection means that serves to structurally connect the first substrate to the second substrate; and first and second electrically conductive microstrips and a first dielectric element disposed upon the first and second substrates such that each substrate carries at least one element selected from the group consisting of the first and second electrically conductive microstrips and the first dielectric element, wherein the first and second electically conductive microstrips interact to facilitate the transfer of energy between the microstrips and the first dielectric element alters frequency characteristics of the transfer of energy.

2. The RF electrical coupling device of claim 1, wherein the substrate connection means further comprises a plurality of solder bumps that space the first substrate from the second substrate.

3. The RF electrical coupling device of claim 2, wherein the plurality of solder bumps define a predetermined separation distance between the first and second substrates, and wherein the plurality of solder bumps have substantially the same height so as to facilitate a generally parallel relationship between the first and second substrates.

4. The RF electrical coupling device of claim 2, wherein the plurality of solder bumps define a predetermined separation distance between the first and second substrates, and wherein the plurality of solder bumps vary in height so as to facilitate a generally graded relationship between the first and second substrates.

5. The RF electrical coupling device of claim 2, wherein the plurality of solder bumps define a predetermined separation distance between the first substrate and the second substrate of about 50 micrometers to about 500 micrometers.

6. The RF electrical coupling device of claim 1, wherein the substrate connection means further comprises a bonding means that structurally bonds the first substrate to the second substrate.

7. The RF electrical coupling device of claim 1, wherein the first electrically conductive microstrip is disposed on the first substrate, the first dielectric element is disposed on the first substrate and the second electrically conductive microstrip is disposed on the second substrate.

8. The RF electrical coupling device of claim 7, wherein the first and second substrates are positioned such that the first electrically conductive microstrip is generally aligned with the second electrically conductive microstrip.

9. The RF electrical coupling device of claim 8, wherein the first electrically conductive microstrip is generally vertically aligned in a mirror-like relationship with the second electrically conductive microstrip.

10. The RF electrical coupling device of claim 8, wherein the first electrically conductive microstrip is generally vertically aligned in an off-centered relationship with the second electrically conductive microstrip.

11. The RF electrical coupling device of claim 8, further comprising a second dielectric element disposed on the second substrate that serves to alter frequency characteristics of the transfer of energy.

12. The electrical coupling device of claim 1, wherein the device is implemented in high speed modulators operating in the about 1 gigahertz to about 40 gigahertz range.

13. The electrical coupling device of claim 1, wherein the first and second substrates comprise the same material.

14. The electrical coupling devices of claim 13, wherein the material is chosen from the group consisting of silicon, germanium, indium phosphate, gallium arsenide, alumina, polytetrafluoroethylene (PTFE), lithium niobate and ceramic.

15. The electrical coupling device of claim 1, wherein the first and second substrates comprise dissimilar materials.

16. The electrical coupling device of claim 15, wherein the material of the first substrate is chosen from the group consisting of silicon, germanium, indium phosphate, gallium arsenide, alumina, polytetrafluoroethylene (PTFE), lithium niobate and ceramic and the material of the second substrate is chosen from the group consisting of silicon, germanium, indium phosphate, gallium arsenide, alumina, polytetrafluoroethylene (PTFE), lithium niobate and ceramic.

17. The electrical coupling device of claim 2, wherein at least one of the plurality of solder bumps provide for electrical connectivity between the first and second substrates.

18. An RF electrical coupling device comprising:

a first substrate having the first electrically conductive microstrip and a first dielectric element disposed thereon;

a second substrate adjacent to the first substrate having a second electrically conductive microstrip disposed thereon; and a substrate connection means that serves to structurally connect the first substrate to the second substrate;

wherein the first and second electrically conductive microstrips interact to facilitate the transfer of energy between the microstrips and the first dielectric element alters frequency characteristics of the transfer of energy.

19. The RF electrical coupling device of claim 18, wherein the substrate connection means further comprises a plurality of solder bumps that space the first substrate from the second substrate.

20. The RF electrical coupling device of claim 19, wherein the plurality of solder bumps define a predetermined separation distance between the first and second substrates, and wherein the plurality of solder bumps have substantially the same height so as to facilitate a generally parallel relationship between the first and second substrates.

21. The RF electrical coupling device of claim 19, wherein the plurality of solder bumps define a predetermined separation distance between the first and second substrates, and wherein the plurality of solder bumps vary in height so as to facilitate a generally graded relationship between the first and second substrates.

22. The RF electrical coupling device of claim 19, wherein the plurality of solder bumps define a predetermined separation distance between the first substrate and the second substrate of about 50 micrometers to about 500 micrometers.

23. The RF electrical coupling device of claim 18, wherein the substrate connection means further comprises substrate bonding means that bonds the first substrate to the second substrate.

24. The RF electrical coupling device of claim 18, wherein the first and second substrates are positioned such that the first electrically conductive microstrip is generally aligned with the second electrically conductive microstrip.

25. The electrical coupling device of claim 24, wherein the first electrically conductive microstrip is generally vertically aligned in a mirror-like relationship with the second electrically conductive microstrip.

26. The electrical coupling device of claim 24, wherein the first electrically conductive microstrip is generally vertically aligned in an off-centered relationship with the second electrically conductive microstrip.

27. The electrical coupling device of claim 18, further comprising a second dielectric element disposed on the second substrate that serves to alter frequency characteristics of the transfer of energy.

28. An RF coupling device, comprising:
- a first substrate having a first and second electrically conductive microstrips disposed thereon;
- a second substrate adjacent to the first substrate having a first dielectric element disposed thereon; and
- a substrate connection means that serves to structurally connect the first substrate to the second substrate,
- wherein the first and second electrically conductive microstrips interact to facilitate the transfer of energy between the microstrips and the first dielectric element alters frequency characteristics of the transfer of energy.

29. The RF electrical coupling device of claim 28, wherein the substrate connection means further comprises a plurality of solder bumps that space the first substrate from the second substrate.

30. The RF electrical coupling device of claim 29, wherein the plurality of solder bumps define a predetermined separation distance between the first and second substrates, and wherein the plurality of solder bumps have substantially the same height so as to facilitate a generally parallel relationship between the first and second substrates.

31. The RF electrical coupling device of claim 29, wherein the plurality of solder bumps define a predetermined separation distance between the first and second substrates, and wherein the plurality of solder bumps vary in height so as to facilitate a generally graded relationship between the first and second substrates.

32. The RF electrical coupling device of claim 29, wherein the plurality of solder bumps define a predetermined separation distance between the first substrate and the second substrate of about 50 micrometers to about 500 micrometers.

33. The RF electrical coupling device of claim 28, wherein the substrate connection means further comprises substrate bonding means that bond the first substrate to the second substrate.

34. The RF electrical coupling device of claim 28, wherein the first and second substrates are positioned such that the first electrically conductive microstrip is generally aligned with the second electrically conductive microstrip.

35. The RF electrical coupling device of claim 34, wherein the first electrically conductive microstrip is generally vertically aligned in a mirror-like relationship with the second electrically conductive microstrip.

36. The RF electrical coupling device of claim 34, wherein the first electrically conductive microstrip is generally vertically aligned in an off-centered relationship with the second electrically conductive microstrip.

37. The RF electrical coupling device of claim 28, further comprising a second dielectric element disposed on the first substrate that serves to alter frequency characteristics of the transfer of energy.

38. An RF electrical coupling device, comprising:
- a first substrate having a first and second electrically conductive microstrips disposed thereon;
- a second substrate adjacent to the first substrate having a third and fourth electrically conductive microstrips disposed thereon; and
- a substrate connection means that serves to structurally connect the first substrate to the second substrate,
- wherein the first, second, third and fourth electrically conductive microstrips interact to facilitate the transfer of energy between the microstrips.

39. The RF electrical coupling device of claim 38, wherein the substrate connection means further comprises a plurality of solder bumps that space the first substrate from the second substrate.

40. The RF electrical coupling device of claim 39, wherein the first and third electrically conductive microstrips are connected by a direct current path through one of the plurality of solder bumps.

41. The electrical coupling device of claim 38, wherein the second and fourth electrically conductive microstrips are connected by alternating current coupling.

42. The electrical coupling device of claim 38, wherein the first and second substrates are formed of barium titanate.

43. The electrical coupling device of claim 38, wherein the first substrate is formed of barium titanate and the second substrate is formed of silicon.

44. The electrical coupling device of claim 38, wherein the first substrate is formed of barium titanate and the second substrate is formed of gallium arsenide.

45. The electrical coupling device of claim 38, wherein the first and second electrically conductive microstrips are disposed on a first surface of the first substrate and the third and fourth electrically conductive microstrips are disposed on a first surface of the second substrate that faces the first surface of the first substrate.

46. The electrical coupling device of claim 38, wherein the first and second electrically conductive microstrips are disposed on a first surface of the first substrate, the third electrically conductive microstrip is disposed on a first surface of the second substrate that faces the first surface of the first substrate and the fourth electrically conductive microstrip is disposed on a second surface of the second substrate.

47. An optical coupling device, comprising:

a first substrate having one or more optical waveguides formed thereon;

a second substrate adjacent to the first substrate having one or more optical waveguides formed thereon; and a substrate connection means that serves to structurally connect the first substrate to the second substrate and to space the first substrate from the second substrate, wherein the one or more optical waveguides formed on the first substrate correspond to at least one optical waveguide formed on the second substrate so as to facilitate optical coupling between the corresponding waveguides.

48. The optical coupling device of claim 47, wherein the substrate connection means further comprises a plurality of solder bumps.

49. The optical coupling device of claim 48, wherein the plurality of solder bumps define a predetermined separation distance between the first and second substrates, and wherein the plurality of solder bumps have substantially the same height so as to facilitate a generally parallel relationship between the first and second substrates.

50. The optical coupling device of claim 48, wherein the plurality of solder bumps define a predetermined separation distance between the first and second substrates, and wherein the plurality of solder bumps vary in height so as to facilitate a generally graded relationship between the first and second substrates.

51. The optical coupling device of claim 48, wherein at least one of the plurality of solder bumps provide for connectivity between the first and second substrate.

52. The optical coupling device of claim 47, wherein the substrate connection means further comprises a substrate bonding means that serves to bond the first substrate to the second substrate.

53. The optical coupling device of claim 47, wherein the first and second substrates comprise the same material.

54. The optical coupling device of claim 47, wherein the material is chosen from the group consisting of silicon, germanium, indium phosphate, gallium arsenide, alumina, polytetrafluoroethylene (PTFE), lithium niobate and ceramic.

55. The optical coupling device of claim 47, wherein the first and second substrates comprise dissimilar materials.

56. The optical coupling device of claim 55 wherein the material of the first substrate is chosen from the group consisting of silicon, germanium, indium phosphate, gallium arsenide, alumina, polytetrafluoroethylene (PTFE), lithium niobate and ceramic and the material of the second substrate is chosen from the group consisting of silicon, germanium, indium phosphate, gallium arsenide, alumina, polytetrafluoroethylene (PTFE), lithium niobate and ceramic.

57. The optical coupling device of claim 47, wherein the first and second substrates are positioned such that the one or more optical waveguides of the first substrate are generally aligned with a corresponding optical waveguide of the second substrate.

58. The optical coupling device of claim 57, wherein the one or more optical waveguides of the first substrate are generally vertically aligned in a mirror-like relationship with a corresponding optical waveguide of the second substrate.

59. The optical coupling device of claim 57, wherein the one or more optical waveguides of the first substrate are generally vertically aligned in an off-centered relationship with a corresponding optical waveguide of the second substrate.

60. The optical coupling device of claim 47, wherein the one or more optical waveguides of the first and second substrates comprise a material chosen from the group consisting of silicon nitride and silicon dioxide.

61. The optical coupling device of claim 48, wherein the plurality of solder bumps define a predetermined separation distance between the first substrate and the second substrate of about 50 micrometers to about 500 micrometers.

62. The optical coupling device of claim 47, wherein the one or more optical waveguides of the first substrate further comprise one or more pairs of optical waveguides disposed in a Mach-Zehnder interferometer formation and the one or more optical waveguides of the second substrate further comprise one or more pairs of optical waveguides disposed in a Mach-Zehnder interferometer formation such that each optical waveguide pair of the first substrate is aligned with a corresponding optical waveguide pair of the second substrate.

* * * * *